United States Patent
Walter et al.

(10) Patent No.: US 7,180,200 B2
(45) Date of Patent: Feb. 20, 2007

(54) STARTER SYSTEM FOR PORTABLE INTERNAL COMBUSTION ENGINE ELECTRIC GENERATORS USING A PORTABLE UNIVERSAL BATTERY PACK

(75) Inventors: Richard T. Walter, Baldwin, MD (US); Michael K. Forster, White Hall, MD (US); Shailesh P. Waikar, Cockeysville, MD (US)

(73) Assignee: Black & Decker Inc., Newark, DE (US)

( * ) Notice: Subject to any disclaimer, the term of this patent is extended or adjusted under 35 U.S.C. 154(b) by 173 days.

(21) Appl. No.: 10/453,988

(22) Filed: Jun. 4, 2003

(65) Prior Publication Data

US 2004/0012204 A1    Jan. 22, 2004

Related U.S. Application Data

(60) Provisional application No. 60/386,904, filed on Jun. 6, 2002.

(51) Int. Cl.
| F02B 63/04 | (2006.01) |
| H02K 7/18 | (2006.01) |
| H02K 23/52 | (2006.01) |
| F02N 11/04 | (2006.01) |

(52) U.S. Cl. .......................... 290/1 A; 290/34
(58) Field of Classification Search ............... 290/1 A, 290/34; 322/10, 16, 29
See application file for complete search history.

(56) References Cited

U.S. PATENT DOCUMENTS

| | | | |
|---|---|---|---|
| 2,526,671 A * | 10/1950 | Kober ........................ 322/96 |
| 3,366,869 A * | 1/1968 | Young ......................... 322/46 |
| 3,908,161 A * | 9/1975 | Messenger ................... 322/29 |
| 4,122,354 A | 10/1978 | Howland ..................... 290/31 |
| 4,743,777 A * | 5/1988 | Shilling et al. ............... 290/46 |
| 4,772,802 A * | 9/1988 | Glennon et al. .............. 290/31 |
| 4,786,852 A * | 11/1988 | Cook .......................... 322/10 |
| 4,830,412 A | 5/1989 | Raad et al. ................... 290/31 |
| 4,883,973 A | 11/1989 | Lakey et al. .................. 290/31 |
| 4,947,100 A * | 8/1990 | Dhyanchand et al. ......... 322/10 |

(Continued)

FOREIGN PATENT DOCUMENTS

DE    29821825 U1    12/1998

(Continued)

OTHER PUBLICATIONS

Communication Relating to the Results of the Partial International Search Report.

*Primary Examiner*—Julio C. Gonzalez
(74) *Attorney, Agent, or Firm*—Harness, Dickey & Pierce, P.L.C.

(57) ABSTRACT

A generator starting system utilizes a portable universal battery pack to start an internal combustion engine of the generator. The system is adapted to utilize any one of a plurality of universal battery packs having outputs of varying voltage. The generator can include a permanent magnet generator having first and second sets of windings. One set of windings generates AC power. The second set of windings is used to drive the PMG as an electric motor using power from the universal battery pack. In an embodiment, the system includes a brushless DC controller that electronically commutates the second set of windings to drive the PMG as a brushless DC motor.

19 Claims, 7 Drawing Sheets

U.S. PATENT DOCUMENTS

| | | | |
|---|---|---|---|
| 4,965,477 A * | 10/1990 | Stadler et al. | 310/114 |
| 5,012,177 A * | 4/1991 | Dhyanchand et al. | 322/10 |
| 5,013,929 A * | 5/1991 | Dhyanchand | 290/31 |
| 5,038,095 A * | 8/1991 | Kirchberg et al. | 322/58 |
| 5,065,086 A | 11/1991 | Takakado | 322/10 |
| 5,091,679 A * | 2/1992 | Murty et al. | 318/153 |
| 5,132,604 A | 7/1992 | Shimane et al. | 322/10 |
| 5,175,439 A | 12/1992 | Harer et al. | 307/10.1 |
| 5,212,952 A | 5/1993 | Yokoyama et al. | 60/721 |
| 5,325,042 A * | 6/1994 | Murugan | 322/10 |
| 5,689,174 A | 11/1997 | Pacheco, Sr. | 322/16 |
| 5,751,070 A | 5/1998 | Nagao et al. | 290/46 |
| 5,920,161 A * | 7/1999 | Obara et al. | 318/139 |
| 5,929,537 A | 7/1999 | Glennon | 307/46 |
| 5,998,976 A | 12/1999 | Steffan | 180/65.2 |
| 6,008,545 A | 12/1999 | Nagano et al. | 290/46 |
| 6,137,251 A * | 10/2000 | Huang et al. | 318/439 |
| 6,202,776 B1 | 3/2001 | Masberg et al. | 180/65.2 |
| 6,265,091 B1 * | 7/2001 | Pierson et al. | 429/1 |
| 6,265,786 B1 | 7/2001 | Bosley et al. | 290/52 |
| 6,313,543 B1 * | 11/2001 | Frank | 290/1 A |
| 6,380,719 B2 * | 4/2002 | Underwood et al. | 322/36 |
| 6,639,370 B1 * | 10/2003 | Gabrys | 318/161 |
| 2004/0080300 A1 * | 4/2004 | Xu et al. | 322/59 |

FOREIGN PATENT DOCUMENTS

| | | |
|---|---|---|
| EP | 488108 A1 | 11/1991 |
| EP | 0338512 B1 | 9/1994 |
| EP | 1138938 A2 | 3/2001 |
| WO | WO 9821805 | 5/1998 |

* cited by examiner

STARTER SYSTEM FOR PORTABLE INTERNAL COMBUSTION ENGINE ELECTRIC GENERATORS USING A PORTABLE UNIVERSAL BATTERY PACK

CROSS-REFERENCE TO RELATED APPLICATIONS

This application claims the benefit of U.S. Provisional Application No. 60/386,904 filed Jun. 6, 2002.

FIELD OF THE INVENTION

This invention relates generally to electrical power generators. More particularly, the invention relates to a system for utilizing a removable, portable universal battery pack and a permanent magnet generator (PMG) to start an internal combustion (IC) engine of the generator.

BACKGROUND OF THE INVENTION

Present day portable generators typically make use of a starter motor and a fixed lead acid battery to start an internal combustion (IC) engine that drives an alternator, thereby producing an electrical power output. The starter motor and fixed battery add size, bulk and weight to the portable generator. As can be appreciated, since the generator is intended to be transportable, keeping the generator as light and as small as possible is highly desirable.

In the latest portable generator technology, the alternator is replaced with a smaller and lighter permanent magnet generator (PMG) and an electronic power converter. In normal operation, the IC engine directly drives the PMG which then produces electrical power. This variable frequency (engine speed dependent), variable voltage power is then converted electronically to a constant voltage, constant frequency output, for example a 120 VAC, 60 Hz output. Typically, a PMG includes a single set of windings that are used to produce the electrical power output of the portable generator.

It would be highly desirable to provide a portable generator that utilizes a removable/portable universal battery pack adapted for use with various other DC powered tools to start the generator, thereby eliminating the need for the fixed lead-acid battery and making the generator lighter in weight and more manageable to maneuver.

It would further be highly desirable to provide a portable generator that utilizes such a portable universal battery pack in combination with a PMG adapted to start the IC engine. This would eliminate the need for the starter motor as well as the lead acid battery, thereby making the generator even lighter in weight and even more manageable to maneuver.

SUMMARY OF THE INVENTION

The above and other objects are provided by a generator having a starting system in accordance with a preferred embodiment of the present invention. The starting system is adapted to receive a removable/portable universal battery pack and includes a system adapted to utilize the battery pack to provide DC power to start an IC engine of the generator. Moreover, the starting system is adapted to utilize any one of a plurality of universal battery packs having various output voltages. For example, the starting system can utilize battery packs ranging from about 8 to about 24 volts DC, or greater. Such universal portable battery packs are commonly used to power cordless power tools, for example, cordless drills and saws. The starting system modulates the voltages such that each battery pack performs as a DC power source providing a predetermined DC output voltage. The starting system then utilizes the DC battery power for starting the IC engine. Thus, a universal battery pack specifically adapted for powering a different power tool can be used to start the generator utilizing the starting system of the present invention.

In one preferred embodiment, the starting system includes a PMG having an additional set of windings or taps that are used to drive the PMG as an electric motor to start the IC engine. In this embodiment, a brushless DC drive circuit is used to drive the PMG as a brushless DC motor to start the IC engine. In an embodiment, the brushless DC drive circuit includes an H-bridge that switches the DC battery power to drive the PMG as a brushless DC motor to start the IC engine. The brushless DC drive circuit can also include a controlled rectifier coupled to the H-bridge. Once the engine is started, the controlled rectifier and H-bridge produce AC output power.

The starting system thus eliminates the need for a fixed, i.e. dedicated, battery and starter motor to be incorporated into the portable generator. This allows the portable generator to be made even lighter and more compact than present day generators that incorporate a fixed battery and starter motor.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application or uses.

Figure 1:
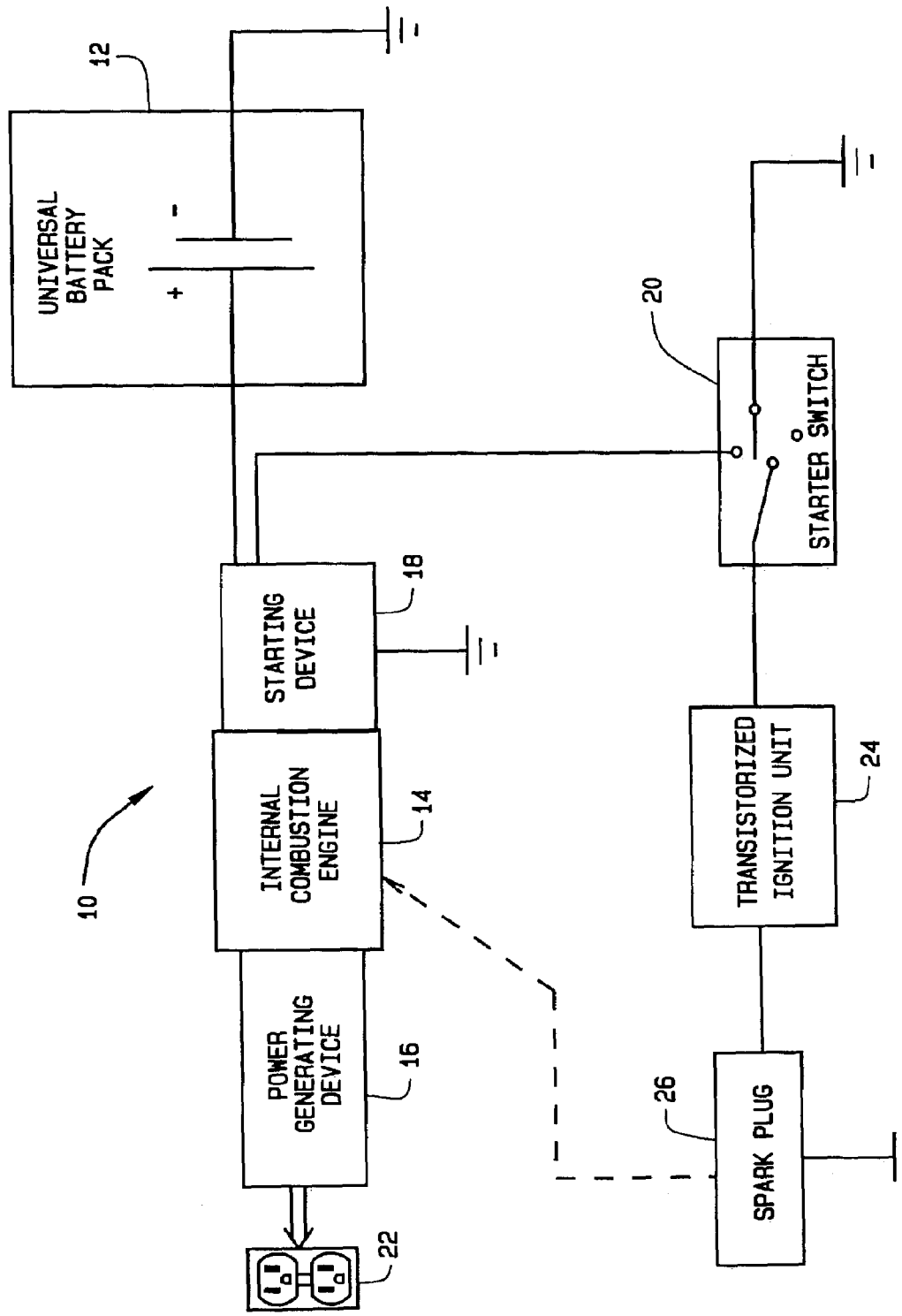
FIG. 1 is a simplified block diagram of a portable generator system, in accordance with an embodiment of the present invention, wherein the system utilizes a portable universal battery pack to start an internal combustion (IC) engine of the generator system.

FIG. 1 is a simplified block diagram of a portable generator system 10, in accordance with an embodiment of the present invention. The generator system 10 utilizes a portable universal battery pack 12 to start an internal combustion (IC) engine 14 that turns a power generating device 16. System 10 additionally includes a starting device 18 connected to universal battery pack 12 and a starter switch 20. Starter switch 20 is connected to a transistorized ignition unit 24, which is in turn connected to a spark plug 26. Starting device 18 is used to turn IC engine 14 at a rate sufficient to start IC engine 14. Once IC engine 14 is started, IC engine 14 drives power generating device 16, whereby power generating device 16 outputs AC power usable by a load connected to an electrical outlet 22.

Figure 2:
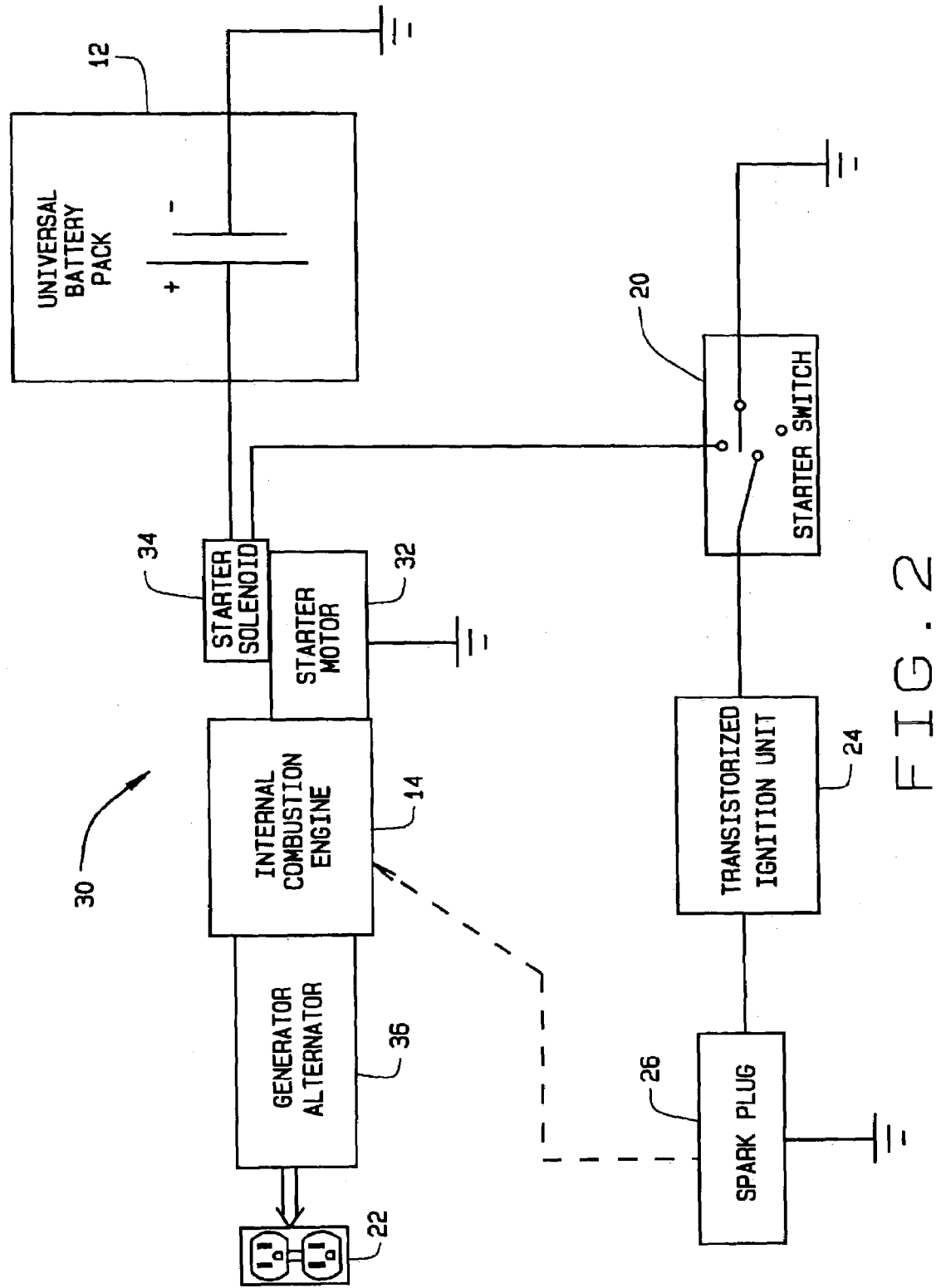
FIG. 2 is a simplified block diagram of an alternate embodiment of the portable generator system shown in FIG. 1.

FIG. 2 is a simplified block diagram of a portable generator system 30, which is an alternate embodiment of portable generator system 10 (shown in FIG. 1). In this embodiment, starting device 18 comprises a starter motor 32 and a starter solenoid 34. Additionally, power generating device 16 is an alternator 36. System 30 utilizes portable universal battery pack 12 to start IC engine 14 that turns alternator 36. Starter solenoid 34 is connected to battery pack 12 and used to initially turn starter motor 32. Starter solenoid 34 is also connected to starter switch 20. Starter switch 20 has a 'Start' position, an 'On' position and an 'Off' position. When starter switch 20 is placed in the 'Start' position, universal battery pack 12 provides low current power to starter solenoid 34.

Providing low current to starter solenoid 34 turns on starter motor 32, thereby turning IC engine 14. Starter switch 20 is spring-loaded so that it returns to the 'ON' position upon successfully starting IC engine 14. In the 'ON' position starter switch 20 directs power from ignition unit 24 to spark plug 26. Each time spark plug 26 fires, spark is provided to IC engine 14, which is utilized to ignite a compressed fuel and air mixture present in a cylinder (not shown) during a compression cycle of IC engine 14. When IC engine 14 is running it turns alternator 36, which creates an output voltage usable to provide AC power at outlet 22.

Figure 3:
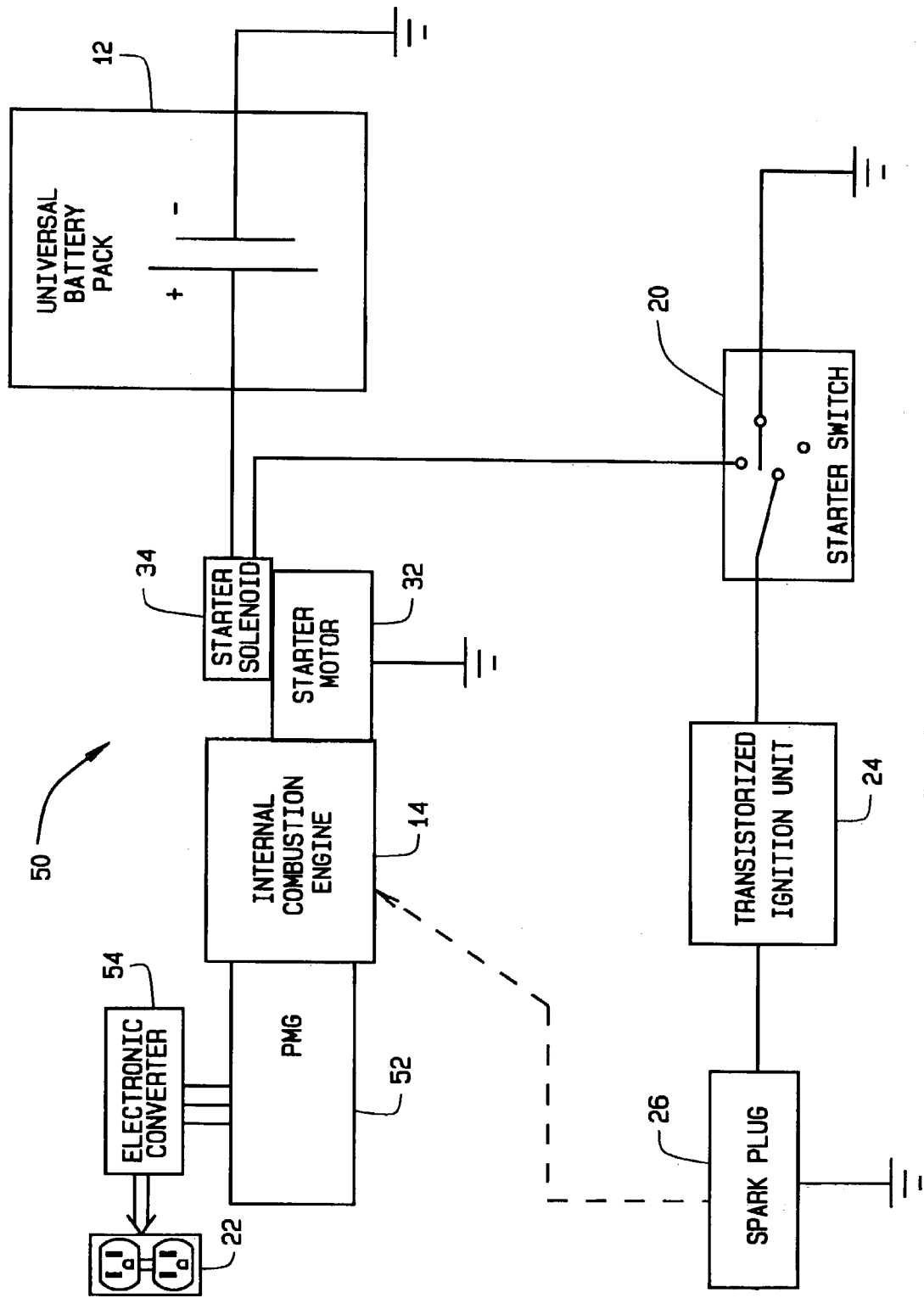
FIG. 3 is a simplified block diagram of another alternate embodiment of the portable generator system shown in FIG. 1 that utilizes a permanent magnet generator and electric converter to generate power.

FIG. 3 is a simplified block diagram of a portable generator system 50, which is an alternate embodiment of portable generator system 30 (shown in FIG. 1). In this embodiment, starting device 18 again comprises starter motor 32 and starter solenoid 34, while power generating device 16 comprises a permanent magnet generator (PMG) 52 and an electronic converter circuit 54. Generator system 50 utilizes portable universal battery pack 12 to start IC engine 14 that turns PMG 52, which is connected to electronic converter circuit 54. As described above in reference to FIG. 2, starter switch 20 has a 'Start' position, an 'On' position and an 'Off' position. When starter switch 20 is placed in the 'START' position, universal battery pack 12 provides low current power to starter solenoid 34 to start IC engine 14 as described above.

When IC engine 14 is running it turns PMG 52, which creates a 3-phase output. The 3-phase output is converted by the electronic converter circuit 54 to usable AC power that is provided to outlet 22. The electronic converter circuit 54 can be any suitable inverter circuit, such as the inverter circuit described in patent application Ser. No. 10/077,219, filed Feb. 15, 2002, entitled Alternator/Inverter With Dual H-Bridge, herein incorporated by reference in its entirety.

Figure 4:
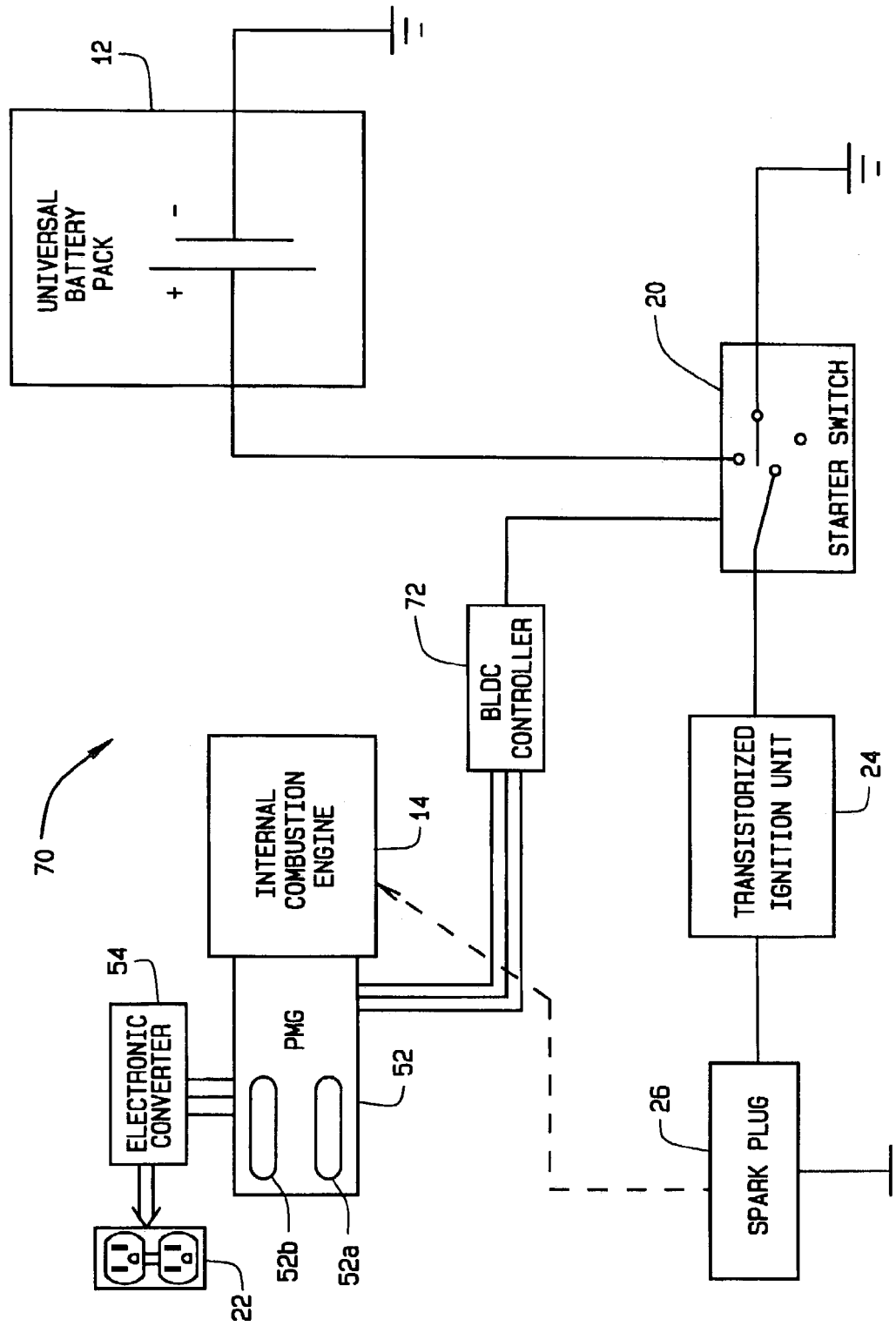
FIG. 4 is a simplified block diagram of yet another alternate embodiment of the portable generator system shown in FIG. 1 that utilizes a permanent magnet generator to start the IC engine.

FIG. 4 is a simplified block diagram of a portable generator system 70, which is yet another alternate embodiment of portable generator system 10 (shown in FIG. 1). In this embodiment, power generating device 16 again comprises PMG 52 and electronic converter circuit 54. Additionally, starting device 18 also comprises PMG 52. PMG 52 includes two sets of 3-phase windings, referred to herein as first windings 52a and second windings 52b. First and second windings 52a and 52b enable PMG 52 to be used as a starter motor for starting IC engine 14, i.e. 'Motor Mode', and a generator for generating AC power output to outlet 22, i.e. 'Generator Mode'. One set of first and second windings 52a, 52b is used to drive PMG 52 as an electric motor when PMG 52 is in the 'Motor Mode' and the other set of first and second windings 52a, 52b is used to generate power when PMG 52 is in the 'Generator Mode.'

Generator system 70 utilizes PMG 52 to start IC engine 14 and to generate AC power. Universal battery pack 12 is connected to PMG 52 via a brushless DC (BLDC) controller 72 and the starter switch 20. When PMG 52 is used in the 'Starter Mode', starter switch 20 is placed in the 'Start' position. Battery pack 12 then provides power to PMG 52, via BLDC controller 72, to drive PMG 52 as a brushless DC motor so that PMG 52 turns IC engine 14. As IC engine 14 turns, ignition unit 24 fires spark plug 26 at predetermined intervals. Each time spark plug 26 fires, spark is provided to IC engine 14. The spark is utilized to ignite the compressed fuel and air mixture present in the cylinder during the compression cycle of IC engine 14. Once the IC engine 14 is started, starter switch 20 is placed back to the 'On' position and IC engine 14 continues running. PMG 52 then stops functioning as a starter motor and switches to the 'Generator Mode'. Thus, PMG 52 begins to function as a generator. As described above in reference to FIG. 3 PMG 52 creates a 3-phase output that is converted by the electronic converter circuit 54 to usable AC power that is provided to outlet 22.

Figure 5:
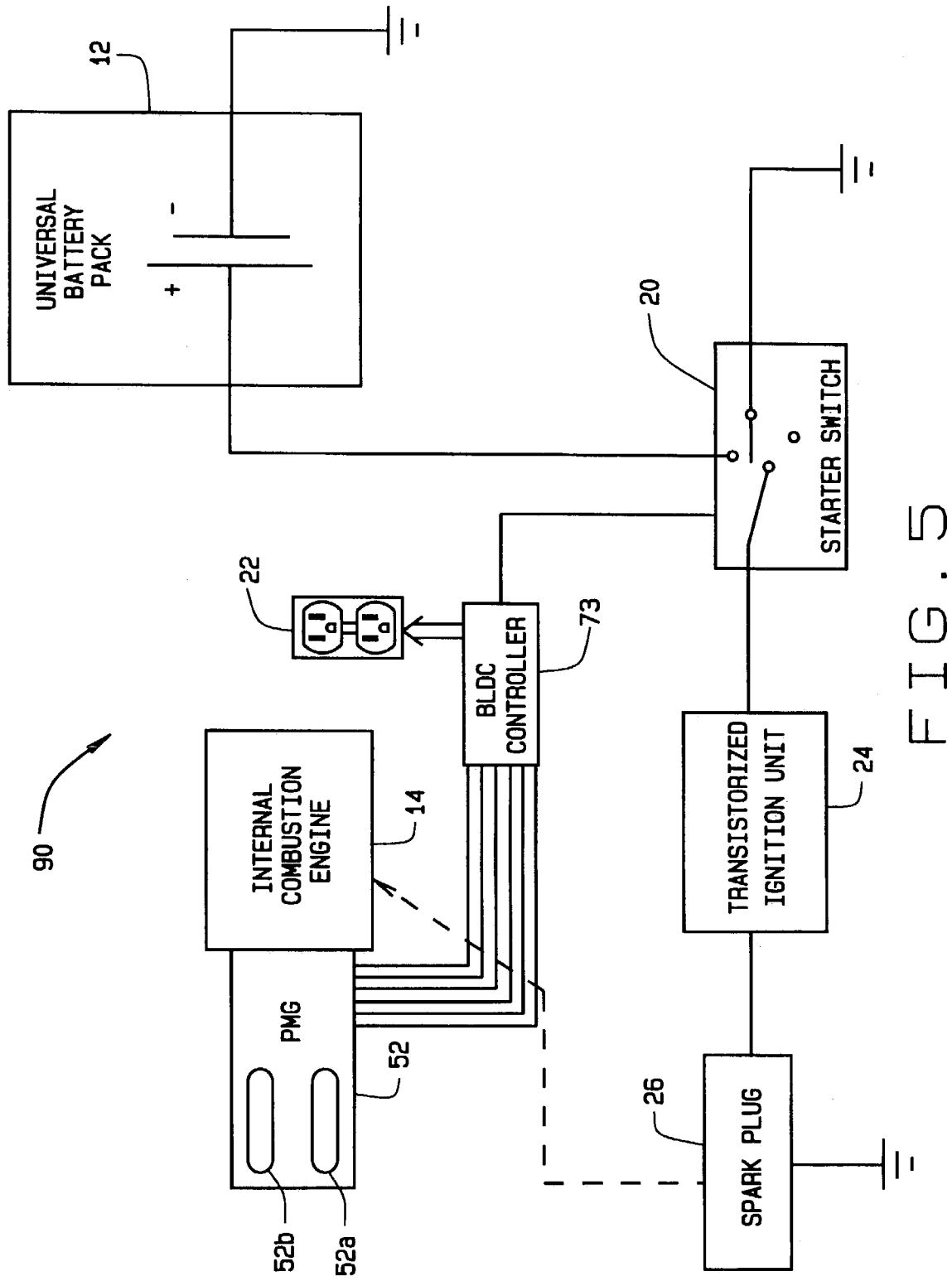
FIG. 5 is a simplified block diagram of still yet another alternate embodiment of the portable generator system shown in FIG. 1, that utilize the permanent magnet generator to start the IC engine.

FIG. 5 is a simplified block diagram of a portable generator system 90, which is still yet another alternate embodiment of portable generator system 10 (shown in FIG. 1). As in system 70, shown in FIG. 4, PMG 52 is used in the 'Motor Mode' to start IC engine 14 and used in the 'Generator Mode' to provide power to outlet 22. However, in this embodiment, the variable voltage, variable frequency power output by PMG 52 is converted to usable AC power, i.e., constant voltage, constant frequency AC power, utilizing BLDC controller 73.

Generator system 90 utilizes PMG 52 to start IC engine 14 and to generate AC power. As described above in reference to FIG. 4, universal battery pack 12 provides power to PMG 52, via BLDC controller 73, such that PMG 52 starts IC engine 14. Once the IC engine 14 is started, starter switch 20 is placed back to the 'On' position and IC engine 14 continues running. PMG 52 then stops functioning as a starter motor and switches to the 'Generator Mode' to provide power to outlet 22. More specifically, PMG 52 creates a 3-phase output. The 3-phase output is converted to AC power by a controlled full wave bridge rectifier circuit and H-bridge bridge circuit included in BLDC controller 73.

Figure 6:
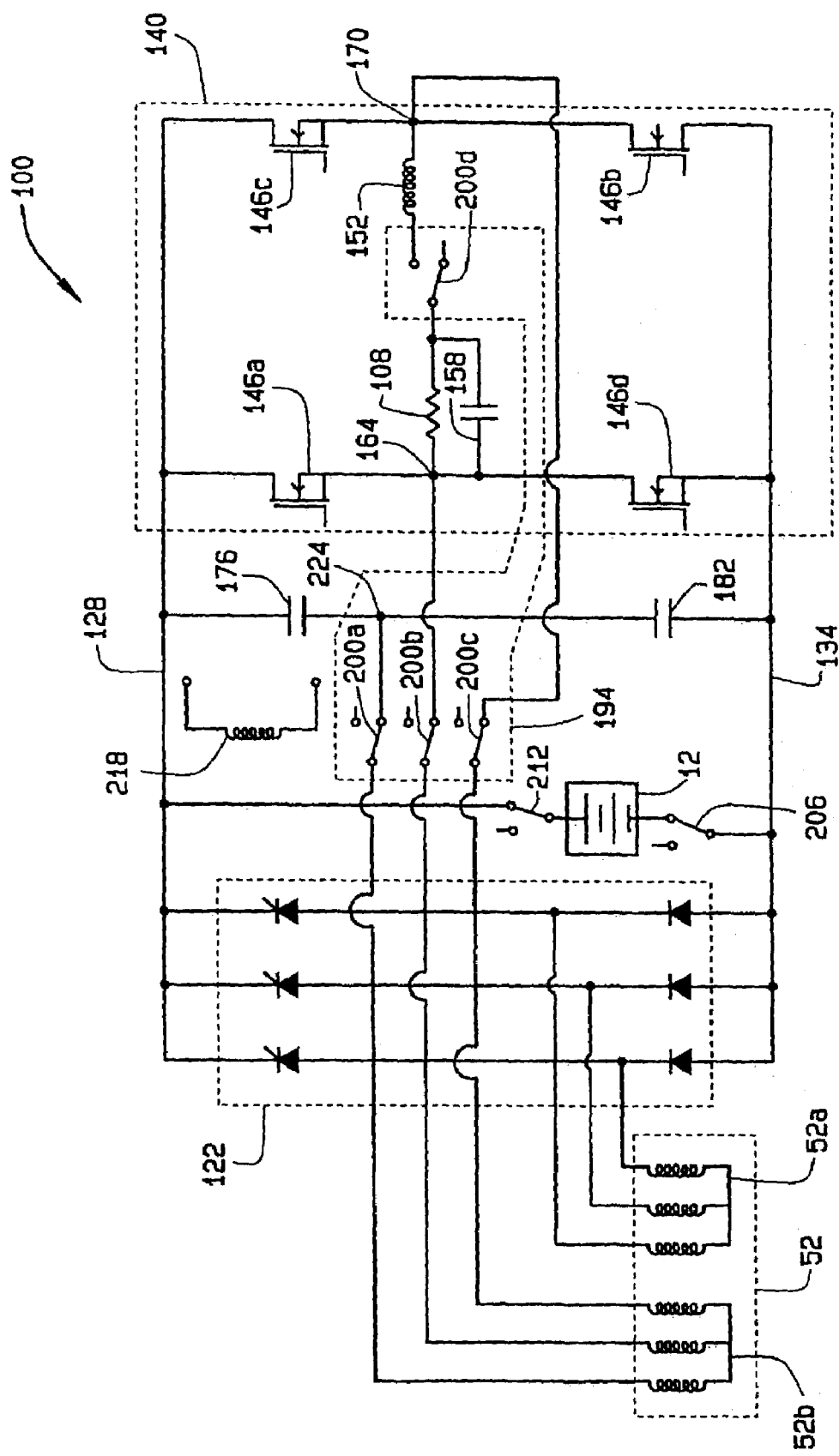
FIG. 6 is a simplified schematic drawing of an embodiment of a brushless DC drive circuit used in the portable generator system shown in FIG. 5.

FIG. 6 is an embodiment of a brushless DC drive circuit 100 included in BLDC controller 73 (FIG. 5). Circuit 100 is ideally suited for use in a portable electric power generator, however, it will be appreciated that the invention is not so limited and may find utility in a variety of related power generating applications.

Circuit 100 is electrically connected to PMG 52 (shown in FIG. 5) which is a three phase permanent magnet generator having first 3-phase windings 52a for running PMG 52 in the 'Generator Mode' and second 3-phase windings 52b for running PMG 52 in the 'Motor Mode'. In 'Generator Mode', PMG 52 outputs electrical power, such as to a load 108, while in 'Motor Mode' PMG 52 rotates IC engine 14 (shown in FIG. 5).

In 'Generator Mode', PMG 52 provides a three phase AC output signal to a controlled full wave bridge rectifier circuit 122. Rectifier circuit 122 is coupled across DC bus lines, or rails, 128 and 134 that form a DC bus. Also coupled across the DC bus is a full H-bridge circuit 140 comprising four identical power switching devices 146a–146d. An inductor 152 and a capacitor 158 are coupled across nodes 164 and 170 and form an LC filter for attenuating harmonic distortion in the output waveform generated by the H-bridge 140. Each of the power switching devices 146a–146d may comprise a variety of suitable power switching components, for example field effect transistors (FET's) or insulated gate bi-polar transistors (IGBT's). A pair of DC bus capacitors 176 and 182 are also coupled in series across the DC bus rails 128 and 134. Although the DC bus capacitance is shown to only include the pair of capacitors 176 and 182, it is envisioned that the DC bus capacitance could comprise any even number of capacitors. One phase of second windings 52b is connected at a center node between even numbers of the DC bus capacitors.

Load 108 is coupled in parallel across capacitor 158. Additionally, DC drive circuit 100 includes a 4-pole relay switch 194 that includes four poles 200a–200d and a coil 218. Universal battery pack 12 is removably inserted in series with key switches 206 and 212 between DC bus lines 128 and 134.

In starting operation, with 4-pole, double throw switch 194 de-energized, as shown, load 108 is disconnected and the three phases of second windings 52b are connected to center nodes 164 and 170 of H-bridge 140 and a center node 224 of the DC bus capacitance. With key switches 206 and 212 turned to a 'Start' position, portable universal battery pack 12 is connected across DC bus rails 128 and 134 and power switching devices 146a–146d are sequenced to run PMG 52 in the 'Motor Mode'. In this mode PMG 52 acts as a motor to turn IC engine 14. The power switching devices 146a–146d are sequenced by signals from a Hall effect position sensor (not shown) and coupled, via an AND gate (not shown), with a pulse width modulated (PWM) signal. Power switching devices 146a–146d create two phases of a three phase drive signal used to drive PMG 52 as a brushless DC motor with capacitors 176, 182 creating the third phase.

The PWM signal is based on the rated voltage output of universal battery pack 12. Thus, the rated voltage output of universal battery pack 12 need not conform to one predetermined DC voltage. The rated voltage output of universal battery pack 12 can be, for example, a voltage preferably of 12 volts or greater, preferably ranging from 12 to 18 volts. For example, a NiCd universal battery pack of 12, 14.4 or 18 volts can be utilized with circuit 100 and regardless of the output voltage, the effective voltage provided to PMG second windings 52b will be approximately equal to that of a 12 volt battery.

When the DC bus voltage exceeds the initial voltage of universal battery pack 12, for example 20 volts or greater, relay coil 218 is energized to disconnect second windings 52b from H-bridge circuit 140 and bus capacitors 176 and 182 and to connect load 108 to the output of H-bridge circuit 140. Once second windings 52b are disconnected from H-bridge circuit 140, PMG 52 is switched to 'Generator Mode'. In 'Generator Mode', PMG 52 outputs variable voltage, variable frequency AC power, via first windings 52a. Full wave bridge rectifier circuit 122 and H-bridge circuit 140 convert the AC power to a constant voltage, constant frequency output, for example a 120 VAC, 60 Hz, that is output from H-bridge circuit 140 to load 108.

Utilizing universal battery pack 12 and PMG 52 to provide starting power to IC engine 14 greatly reduces the size and weight of generator system 90. It is envisioned that universal battery pack 12 can be any universal battery pack commonly used in many cordless power tools, for example the DEWALT XR PLUS (Extended Run Time Plus) line of batteries.

Figure 7:
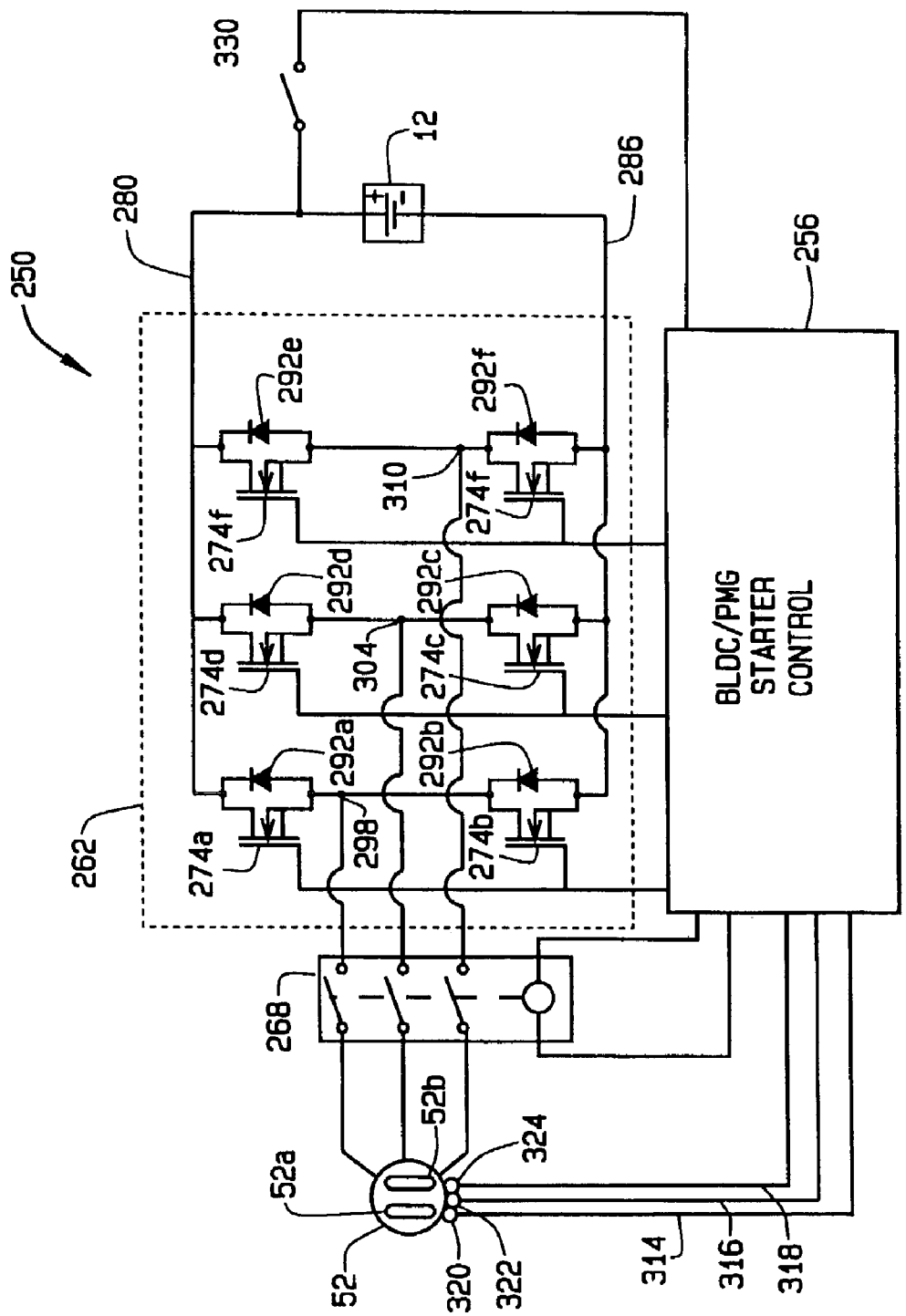
FIG. 7 is a simplified schematic drawing of another embodiment of a brushless DC drive circuit used in the portable generator system shown in FIG. 4.

FIG. 7 is a simplified schematic drawing of a preferred embodiment of a brushless DC motor drive circuit 250 included in BLDC controller 72 used in portable generator system 70 (shown in FIG. 4). Drive circuit 250 is used to drive PMG 52 as a brushless DC motor to start IC engine 14 (shown in FIG. 4). Circuit 250 is a low voltage DC to AC 3-phase inverter that incorporates a Brushless DC/Permanent Magnet Generator (BLDC/PMG) starter control 256, and is powered directly by universal battery pack 12. DC drive circuit 250 includes a power stage 262 that is electrically connectable to PMG 52 through a 3-pole relay switch 268. Power stage 262 includes six identical power switching devices 274a–274f coupled across DC bus lines, or rails, 280 and 286.

Power switching devices 274a and 274b are connected in series between bus lines 280 and 286 having a center node 298 electrically connected to one pole of relay 268. Power switching devices 274c and 274d are connected in series between bus lines 280 and 286 having a center node 304 electrically connected to a second pole of relay 268. Power switching devices 274e and 274f are similarly connected in series between bus lines 280 and 286 having a center node 310 electrically connected to a third pole of relay 268. Six diodes 292a–292f are respectively connected in parallel with switching devices 274a–274f, between bus lines 280 and 286. Switching devices 274a–274f may comprise a variety of suitable power switching components, for example field effect transistors (FET's), insulated gate bi-polar transistors (IGBT's), or metal oxide silicon field effect transistors (MOSFET's).

The 3-phase PMG 52 includes position sensors 320, 322 and 324, which are illustratively Hall effect sensors, that are connected to BLDC/PMG starter control 256 by lines 314, 316 and 318, respectively. Position sensors 320, 322, 324 sense the position of a rotor (not shown) of PMG 52. Additionally, DC drive circuit 250 includes a momentary starter switch 330 that controls the flow of current from universal battery pack 12 to BLDC/PMG starter control 256.

In operation, initially IC engine 14 is at rest. The IC engine 14 is started by a user closing momentary start switch 330. The BLDC/PMG starter control 256 will then become energized by universal battery pack 12. Provided the position sensors 320, 322 and 324 indicate that either the speed of IC engine 14 or the speed of PMG 52 is less than a predetermined value, e.g. 600 rpm, 3-pole relay switch 268 will be energized by BLDC/PMG starter control 256, thereby connecting the 3-phase power stage 262 to PMG 52. Utilizing information from position sensors 320, 322 and 324, the switching devices 274a–274f are turned on and off by BLDC/PMG starter control 256. The switching of switching devices 274a–274f electronically commutates second 3-phase windings 52b within PMG 52 to drive PMG 52 as a brushless DC motor to rotate IC engine 14 to start it.

Thus, when PMG 52 is in 'Motor Mode', IC engine 14 will be turned by PMG 52 acting as a motor and will accelerate up to a speed to start IC engine 14. Once IC engine 14 has started, PMG 52 is driven past a predetermined maximum speed, e.g. 600 rpm, and 3-pole relay switch 268 will then be de-energized, thereby disconnecting power stage 262 from PMG 52. Disconnecting power stage 262 avoids overdriving universal battery pack 12 and supplying excessive voltage to switching devices 274a–274f. Once the starting operation is complete, momentary starter switch 330 is opened.

BLDC/PMG starter control 256 can be microprocessor based to simplify the electronic circuitry and to provide additional control features. Additional control features may include setting a maximum cranking time, e.g. 5 seconds, to avoid damage if momentary starter switch 330 is held closed for too long, or not attempting starting of IC engine 14 when universal battery pack 12 does not have sufficient voltage to turn or start IC engine 14. Further control features provided by a microprocessor based BLDC/PMG starter control 256 may include speed detection and control of 3-pole relay switch 268 to avoid overdriving universal battery pack 12 and power stage 262. Even further control features may include setting an upper starting speed of PMG 52 regardless of the voltage of universal battery pack 12 by utilizing pulse width modulation control of switching devices 274a–274f above a minimum speed.

In an alternate embodiment, PMG 52 includes a single set of tapped windings. In this embodiment, the first windings 52a comprise the full windings, which are used to generate AC power in the 'Generator Mode'. The second windings 52b comprise the tapped portion of the windings, which are used to drive PMG 52 as a motor in the 'Motor Mode' to start the IC engine 14.

Although the present invention has been shown and described in connection with a portable generator using a single PMG and a single alternator/inverter circuit, or a single brushless DC drive circuit, the present invention could just as readily be adapted for use with starter systems of portable generators utilizing a pair of PMG's and a pair of alternator/inverter circuits. Alternatively, the present invention could be used with a portable generator using a pair of PMG's with a pair of brushless DC motor drive circuits, such as that described in patent application Ser. No. 10/077,386, filed Feb. 15, 2002, entitled Alternator/Inverter With Dual H-Bridge and Automatic Voltage Regulation, herein incorporated by reference in its entirety. The invention is further applicable to all types of small IC engines, for example a lawnmower engine. Thus, the scope of the invention should not be construed as being limited only to portable generators.

The present invention thus provides a means for starting an internal combustion engine utilizing a universal battery pack, wherein the universal batter pack is able to be used with other cordless power tools. Also, by controlling an H-Bridge switching circuit in a predetermined switching sequence, the H-Bridge can be used to control the application of power to a PMG to enable the PMG to be effectively used as a starter motor to start the internal combustion engine.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. An electrical generator system, said system comprising:
    a generator device that generates AC power that includes a permanent magnet generator (PMG);
    an internal combustion (IC) engine coupled to the generator device that drives the generator device;
    a starting device coupled to the IC engine, the starting device including the PMG;
    the PMG electrically connected to a brushless DC controller (BLDC) that electronically commutates windings of the PMG to drive the PMG as a brushless DC motor to start the IC engine;
    the PMG including first windings for generating the AC power and second windings for driving the PMG as the starting device, the BLDC connected to the second windings of the PMG; and
    a portable universal battery pack coupled to the starting device that provides DC power to the starting device.

2. The system of claim 1, wherein the portable universal battery pack includes any one of a plurality of portable universal battery packs with various voltage ratings used to power a cordless tool.

3. The system of claim 1, wherein the generator device includes an alternator.

4. The system of claim 1, wherein the PMG is electrically connected to an electronic converter that converts AC power generated by the first windings to AC power usable by a load.

5. The system of claim 1 wherein the PMG includes a first set of tapped windings having a full portion and a tapped portion, the full portion comprising the first windings and the tapped portion comprising the second windings.

6. The system of claim 1, wherein the BLDC includes a drive circuit having a plurality of switching devices that are sequenced to electronically commutate the second windings to drive the PMG as an electric motor.

7. An electrical generator system, said system comprising:
    a generator device that generates AC power that includes a permanent magnet generator (PMG);
    an internal combustion (IC) engine coupled to the generator device that drives the generator device;
    a starting device coupled to the IC engine, the starting device including the PMG;
    the PMG electrically connected to a brushless DC (BLDC) controller that electronically commutates windings of the PMG to drive the PMG as a brushless DC motor to start the IC engine;
    a portable universal battery pack coupled to the starting device that provides DC power to the starting device; and
    the BLOC controller including:
        a H-Bridge circuit that provides pulse width modulated current to the second windings to drive the PMG as a motor to start the IC engine; and
        a full wave rectifier circuit that converts AC power generated by the first windings to AC power usable by a load.

8. A method for operating a portable generator that includes a permanent magnet generator (PMG), said method comprising:
    starting the generator using a portable universal battery pack that provides DC power to operate a brushless DC controller (BLDC) connected to the PMG to commutate windings of the PMG to drive the PMG as a motor that rotates an internal combustion (IC) engine to start the IC engine, the portable universal battery pack comprising any one of a plurality of portable universal battery packs with various voltage ratings used to power a cordless tool; and driving the PMG with the IC engine after the IC engine is started and outputting AC power from the PMG driven by the IC engine wherein outputting AC power includes outputting AC power from first windings of the PMG and commutating the windings of the PMG with the BLDC to drive the PMG as a motor includes commutating second windings of the PMG with the BLDC.

9. The method of claim 8, wherein outputting AC power includes driving an alternator with the IC engine.

10. The method of claim 8, wherein outputting AC power further includes converting the AC power output by the first windings to AC power usable by a load utilizing an electronic converter electrically connected to the PMG.

11. The method of claim 8, wherein commutating the second windings of the PMG includes sequencing a plurality of switching devices of a motor drive circuit included in the BLDC controller to commutate the second windings.

12. The method of claim 8 wherein the PMG includes a first set of tapped windings having a full portion and a tapped portion, the full portion comprising the first windings and the tapped portion comprising the second windings.

13. A method for operating a portable generator that includes a permanent magnet generator (PMG) having first and second windings, said method comprising:

starting the generator using a portable universal battery pack that provides DC power to operate a brushless DC controller (BLDC) connected to the PMG to commutate the second windings of the PMG to drive the PMG as a motor that rotates an internal combustion (IC) engine to start the IC engine, the portable universal battery pack comprising any one of a plurality of portable universal battery packs with various voltage ratings used to power a cordless tool; and driving the PMG with the IC engine after the IC engine is started and outputting AC power from the first windings of the PMG; and wherein energizing the second windings of the PMG includes providing pulse width modulated current to the second windings utilizing the BLDC electrically connected to the PMG, the BLDC including a H-Bridge circuit adapted to generate the pulse width modulated current.

14. The method of claim 13, wherein outputting AC power further includes converting the AC power output by the first windings to AC power usable by a load utilizing a rectifier circuit included in the BLDC controller.

15. A starting system for starting an internal combustion (IC) engine, said system comprising:

a starting device for rotating the IC engine including a permanent magnet generator (PMG) electrically connected to a brushless DC controller (BLDC), the BLDC electrically connected to the battery pack;

the PMG comprising first windings for generating AC power and second windings for driving the PMG as an electric motor; and a portable universal battery pack adapted to provide DC power to operate the starting device, the portable universal battery pack comprising any one of a plurality of portable universal battery packs with various voltage ratings.

16. The system of claim 15, wherein the second windings of the PMG are electrically connected to the brushless BLDC that electrically commutates the second windings to drive the PMG as an electric motor.

17. The system of claim 16, wherein the BLDC includes a drive circuit having a plurality of switching devices that are sequenced to electronically commutate the second windings to drive the PMG as an electric motor.

18. The system of claim 16 wherein the PMG includes a first set of tapped windings having a full portion and a tapped portion, the full portion comprising the first windings and the tapped portion comprising the second windings.

19. A starting system for starting an internal combustion (IC) engine, said system comprising:

a starting device for rotating the IC engine including a permanent magnet generator (PMG) electrically connected to a brushless DC controller (BLDC), the BLDC electrically connected to the battery pack; and a portable universal battery pack adapted to provide DC power to operate the starting device, the portable universal battery pack comprising any one of a plurality of portable universal battery packs with various voltage ratings;

the PMG comprising first windings for generating AC power and second windings for driving the PMG as an electric motor the BLDC including:
a H-bridge circuit that provides pulse width modulated current to the second windings to drive the PMG as an electric motor to start the IC engine; and
a full wave rectifier circuit that converts AC power generated by the first windings to AC power usable by a load.

* * * * *